Figure 1:
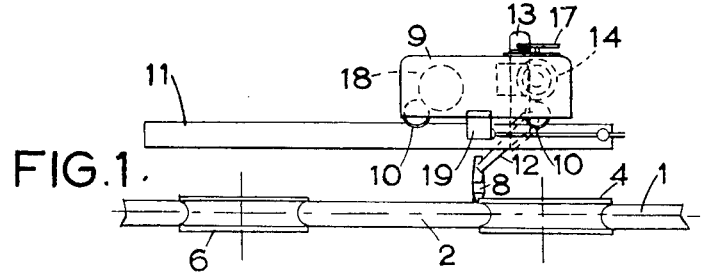

July 24, 1956  J. A. DONELAN  2,756,309
APPARATUS AND METHODS FOR WELDING ELECTRIC CABLE SHEATHS
Filed Dec. 2, 1953  2 Sheets-Sheet 1

Inventor
James Arthur Donelan
By
Attorney

2,756,309

APPARATUS AND METHODS FOR WELDING ELECTRIC CABLE SHEATHS

James Arthur Donelan, West Harrow, England, assignor to Pirelli-General Cable Works Limited, London, England, a British company Application December 2, 1953, Serial No. 395,690

Claims priority, application Great Britain December 3, 1952

14 Claims. (Cl. 219—6)

The present invention relates to apparatus and methods for electric arc welding a seam in a metallic electric cabel sheath. It has been proposed that a cable should be sheathed with a metallic covering formed from aluminium or other metal strip by bending the strip progressively to form an open tube surrounding a cable core or cores, the edges of the strip material subsequently being welded together to form a closed sheath surrounding the cable core or cores. A method of manufacturing such a cable is disclosed in the specification of our co-pending patent application Serial No. 335,374. According to this specification it was proposed to weld a longitudinal seam extending along the length of the cable sheath and the present invention is especially applicable to the welding of such seams, but can also be applied, if desired, to the welding of a helical seam extending along and around a cable sheath, the sheath in this case being formed by wrapping strip material helically around a cable core or cores.

As described in the above specification, bending of the metal strip to form a longitudinally seamed sheath around the cable core or cores is effected by passing the combination of strip and cores through a series of progressively shaped pairs of rolls, any or all of which may be power driven to impart the required motion to the combination; if necessary, the sides of the strip are previously trimmed and the strip is subjected to a scratch-brushing operation in order that clean surfaces may be presented for welding. On emerging from the final pair of bending rolls, the longitudinal seam is welded by a torch, appropriately of the argon-arc type, located, for normal operation, at a short distance beyond these rolls (having regard to the direction of motion of the sheath); this is referred to as the normal position of the torch. The sheath then passes between a pair of guide rolls, located and shaped to retain the edges of the strip in close contact on starting the welding operation.

If, for any reason, it is necessary to interrupt the welding operation, on account of the mechanical inertia of the moving parts, movement of the sheath may continue for a short interval after the welding current has ceased or at least diminished, so that a corresponding length of seam either remains unwelded or the weld is not satisfactorily performed. Further, difficulty has been found in originally starting to weld the seam by reason of the tendency of the edges of the strip to spring apart and leave a slight gap which is a hinderance in starting the weld. It is the main object of the present invention to overcome these drawbacks.

According to the invention, in apparatus for welding together the edges of a metal strip formed to constitute a sheath for an electric cable, by movement of the said strip past a normally stationary welding torch, provision is made whereby the welding torch may be bodily moved in the direction of the seam at which the edges of the strip are united. Thus, on re-starting the welding operation after interruption, the torch may be moved forward from its normal position (that is in the direction of travel of the sheath) so that a short length of the seam is re-welded and proper continuity of the weld thus ensured. Also, on originally starting to weld the seam, the torch may be brought into proximity to the pair of guide rolls which serve to maintain the edges of the strip in intimate contact and difficulty due to the presence of a gap is avoided. On solidification and contraction of the metal just welded the edges are drawn together, so that it is not necessary to continue the welding operation in proximity to the guide rolls.

Accordingly, after starting or re-restarting, as the case may be, the welding torch is returned to the above-mentioned normal position; this movement may be produced manually, but the present invention includes the provision of means for automatically effecting return at a predetermined speed, and also for increasing the welding current during the period of return, this being desirable, since during this period, the speed of passage of the sheath relatively to the torch is above the normal. The return movement must be comparatively slow in order that the heat input per unit length of seam during welding while the welding torch is moving may not be greatly less than the heat input under normal conditions when the welding torch is stationary.

Figure 2:
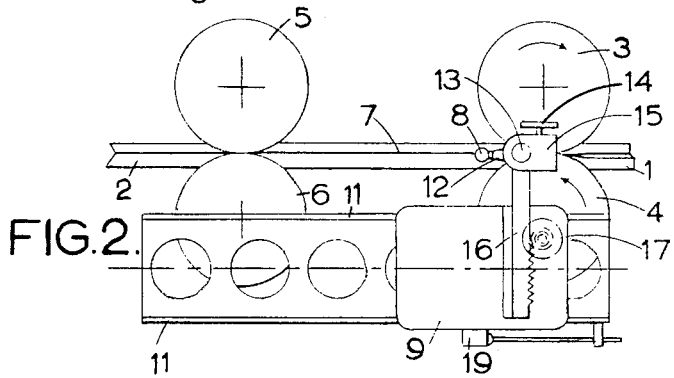
Figure 3:
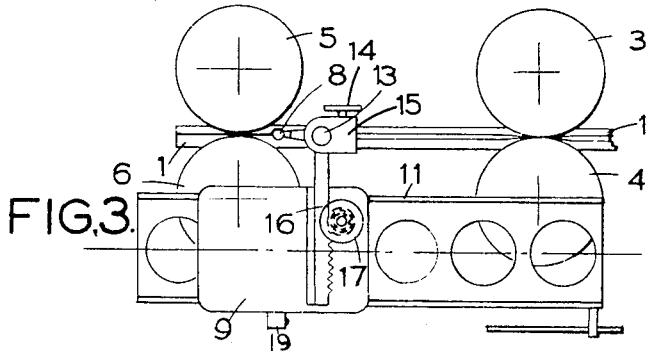
Figure 4:
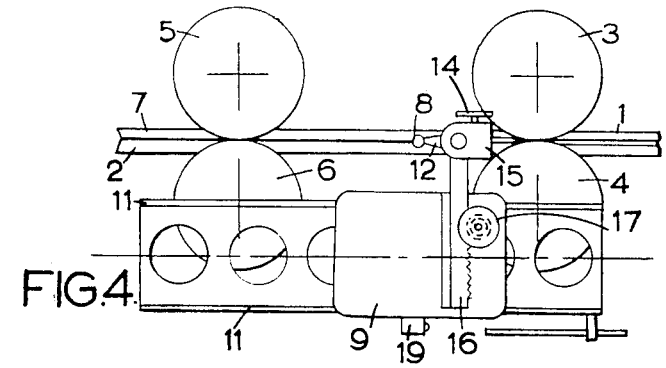
Figure 5:
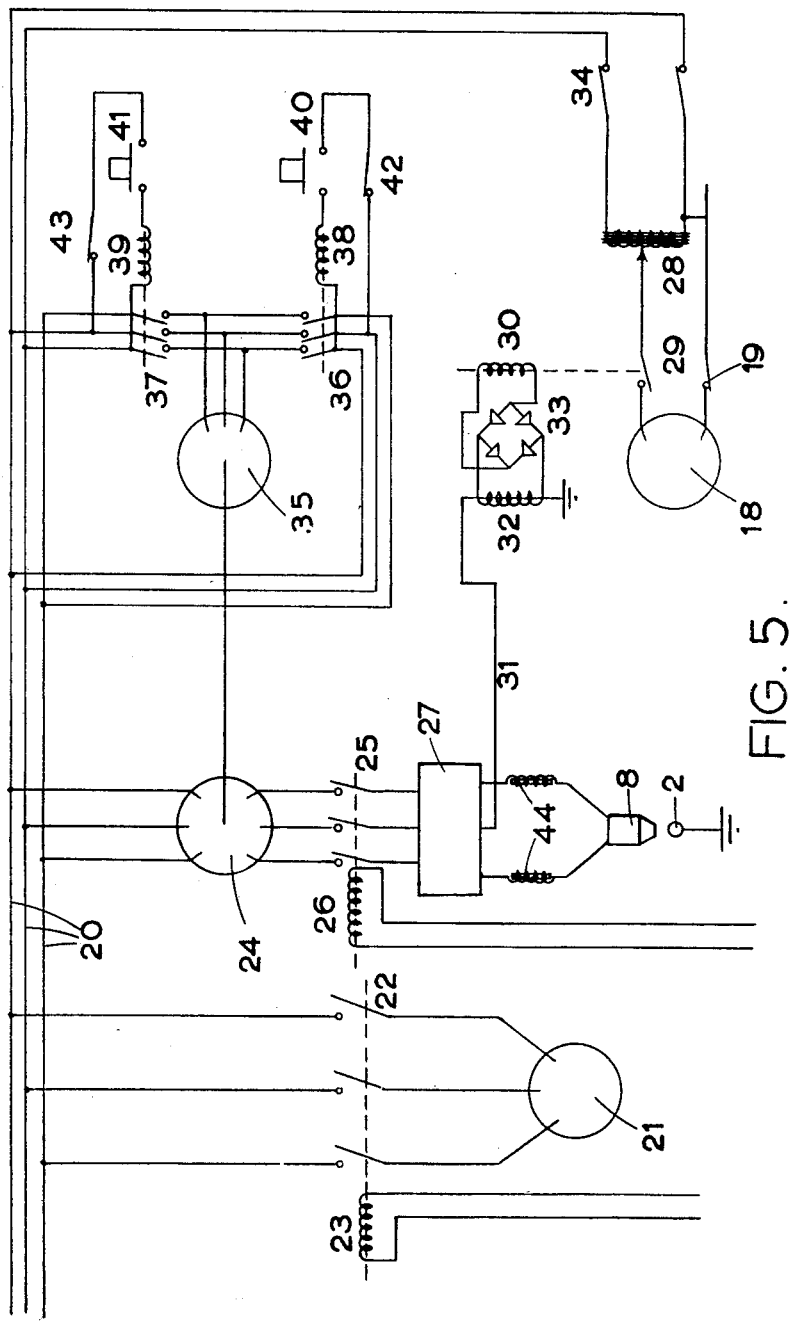

In order that the invention may be clearly understood and readily carried into effect, it will now be described more fully with reference to the accompanying drawings which illustrate, by way of example, a form of welding apparatus in accordance therewith suitable for dealing with a cable sheath having a longitudinal seam, and wherein:

Figures 1 and 2 are respectively a side elevation and a plan view of the welding apparatus showing the torch in the above-mentioned normal position, Figures 3 and 4 are plan views of the welding apparatus respectively showing the torch in the starting and re-starting positions and Figure 5 is a diagram of connections illustrating one mode of securing the desired movement of the torch and regulation of the welding current.

Referring to Figures 1 and 2, the strip 1, of aluminium or other metal, is depicted as having been bent, by passage through a series of forming rolls, to constitute a sheath 2 which encloses one or more cable cores. Such a means of forming a sheath is well known and accordingly, as it constitutes no part of the present invention, only a final pair of forming rolls 3 and 4 is shown, these serving to bring the edges of the strip 1 into close proximity to form the sheath 2. The rolls 3 and 4 and/or any of the preceding pairs of rolls are rotated by a drive motor in such a direction as to impel the strip 1 toward the left as seen in Figures 1 and 2 and through a pair of guide rolls 5 and 6.

The welding torch 8, preferably of the argon-arc type, is borne by a carriage 9 resting, by means of wheels 10, on rails 11 located parallel to the direction of travel of the sheath 2. The torch 8 is supported by an arm 12 attached to a spindle 13 adjustable vertically by rack-and-pinion mechanism by means of a knob 14. The member 15, in which the spindle 13 is mounted, is itself carried by a toothed rack 16 arranged to be movable transversely to the carriage 9 by a pinion operated by a knob 17. Thus the position of the torch 8 is adjustable vertically and transversely on the carriage 9 in order to bring it into correct relationship with the sheath 2. The carriage 9 may be propelled along the rails 11 by a variable-speed electric motor 18, referred to below as the tractor motor, contained within the carriage and driving the wheels 10.

It is to be understood that the equipment would include leads for the welding current, tubes for supply of cooling water and argon or other gas and any other supply connections which may be required: the provision of all these elements being matters of common practice and constituting no part of the present invention, they have not been shown on the drawings in order to avoid unnecessary complexity. For the same reason the sources of supply of the cables cores and metal strip, devices for the preliminary treatment of this strip and pairs of bending rolls for gradually forming it into a sheath, as well as means for winding off the sheathed cable, have been omitted.

When the welding of the seam 7 has been started, in order that it may be continuously proceeded with, the welding torch 8 occupies the normal position shown in Figures 1 and 2, that is to say a short distance beyond the rolls 3 and 4. By reason of the completed seam 7 and of the grip exerted on the bent-up strip 1 by the rolls 3 and 4, any tendency for the edges of the strip to spring apart along the length between the rolls and the torch is counteracted, so that a satisfactory weld may be made.

On starting to weld the edges of the strip 1 together however, there is no completed seam 7 and hence a gap would appear between these edges opposite the torch in its normal position. When it is desired to start a weld therefore, the carriage 9 is moved, for example, manually, along the rails 11 to the position indicated in Figure 3, so as to bring the torch 8 in close proximity to the rolls 5 and 6, by which the gap is eliminated. This movement may be effected manually or by means of the tractor motor 18.

The weld having then been started, the carriage 9 is gradually returned by means of the tractor motor 18, until the torch 8 occupies its normal position at which the weld is continued. On arrival at this position, the carriage 9 encounters a fixed member which serves to trip a limit switch 19 whereby the motor 18 is stopped. The speed of this return movement is conveniently 10 per cent or less of that of the sheath 2 through the machine, and during the return period the welding current may be increased by an amount sufficient to compensate for the effect of the temporarily augmented rate of relative movement of the sheath 2 past the torch 8. Means for automatically effecting the return of the carriage and for increasing the welding current in this period are described below.

A similar procedure may be adopted in the case, referred to above, in which, a length of the seam 7 having been completed, it becomes necessary to interrupt the welding operation: in such a case, in order to ensure perfect continuity of the weld, it is advisable to re-weld a short length of the seam 7, and for this purpose the carriage 9 may be partially advanced so as to bring the torch 8 opposite a point on the seam 7 at which the weld has been satisfactorily completed, as indicated in Figure 4. The amount of advance would be determined by the operator in accordance with prevailing conditions: for example, if the cable sheath 2 is arranged to move past the welding torch 8 at a speed of the order of, say, three to six feet per minute, the torch may be positioned to overlap the end of the already welded seam 7 by one to two inches. As soon as welding has been re-started, gradual return of the torch 8 to its normal position, with temporary increase of welding current, is put into operation as above described.

Referring now to Figure 5, the current supply is shown as derived from three-phase mains 20, although any other appropriate system of supply might be employed. The drive motor 21, whereby passage of the sheath 2 and the enclosed cable cores is effected, is connected to the mains 20 through a three-pole contactor 22 having an operating coil 23 adapted to be suitably excited when apparatus necessary for the proper functioning of the machine, such as the scratch brush and means for circulation of cooling water and argon gas et cetera, have been brought into operation. Description of these items is unnecessary since they are commonly included in welding technique and constitute no part of the present invention.

Supply from the mains 20 to the welding torch 8 is through an induction regulator 24, a three-pole contactor 25 having an operating coil 26 and a three-to-two-phase transformer 27 whereby two-phase current is supplied through choking coils 44, to the torch, the sheath 2 being earthed as shown. In this case also, the coil 26 is excited to close the contactor 25 at the appropriate moment by a combination of apparatus commonly used in welding operations of the present kind.

The tractor motor 18 is connected across one of the phases of the supply by means of a known form of speed-regulating device 28, through the limit switch 19 and a contactor 29 under the control of operating coil 30. For the excitation of the latter, a neutral earthed connection 31 from the secondary winding of the transformer 27 constitutes the primary winding of a current transformer 32, whereof the secondary winding supplies the coil 30 through a bridge-connected rectifier 33. Thus, on establishment of the welding current between the torch 8 and sheath 2, the contactor 29 is closed. If, however, the torch is in its normal position, the limit switch 19 will be open, so that the motor 18 will not start. Movement of the torch to the starting or re-starting position allows the limit switch 19 to close (with suitable delay if desired) so that the motor 18 starts to return the torch to its normal position; (in the apparatus illustrated movement from that position is performed manually). Additional control of the motor 18 is provided by a manually operated double-pole switch 34.

Regulation of the welding current is afforded by the induction regulator 24 under the control of a reversible motor 35. By means of three-pole contactors 36, 37, the motor 35 may be alternatively connected to the mains 20 in order to cause rotation in one direction or the other and thereby produce increase or decrease of the welding current. These contactors are respectively actuated by coils 38, 39, connected across one of the supply phases through control buttons 40, 41 and limit switches 42, 43. Suitable means may be provided to ensure alternative operation only of the buttons 40 and 41.

In order to secure the required augmented welding current during return of the torch from its start or restart position to its normal position, the button 40 is pressed until the desired increase is attained; on the normal position being reached, the current is brought back to its previous value by actuation of the button 41. The use of these control buttons 40 and 41 is not, of course, confined to periods of return of the torch to its normal position: they may be employed generally for any regulation of the welding current deemed necessary by the operator of the machine. If neither button be closed, the induction regulator 24 remains stationary.

It is to be understood that, in respect of the various relay-actuated contactors employed, the usual hold-on and release devices would be provided: representation of these on the drawings has been omitted in order to promote clarity. Similarly, mechanical and electrical devices normally employed in welding technique in order to secure correct sequence of the various operations involved, as also automatic stop mechanism, being well known in the art, have been omitted from the description and drawings.

What I claim and desire to secure by Letters Patent of the United States is:

1. Apparatus for forming a metal strip to constitute a sheath around at least one electric cable core, comprising in combination means for progressively bringing the edges of the strip into juxtaposition around a cable core, a welding torch for welding the edges of the strip together along a seam, said torch having a normal stationary welding position, means for moving the formed strip and the enclosed cable core past said torch, means mounting said torch for movement parallel to the seam prior to starting or re-starting of the torch from its normal stationary position in the same direction as the direction of movement of the strip and cable and after starting or re-starting of the torch back to said normal stationary position in a direction opposite to the direction of movement of the strip and cable, and means operative upon starting or re-starting of the torch for moving said torch back to its normal stationary position at a uniform speed.

2. Apparatus for forming a metal strip to constitute a sheath around at least one electric cable core, comprising in combination means for progressively bringing the edges of the strip into juxtaposition around a cable core in the longitudinal direction of the cable, a welding torch for welding the edges of the strip together along a seam, said torch having a normal stationary welding position, means for moving the formed strip and the enclosed cable core past said torch, means mounting said torch for movement parallel to the longitudinal axis of the cable prior to starting or re-starting of the torch from its normal stationary position in the direction of movement of the cable and after starting or re-starting of the torch back to its normal stationary position in a direction opposite to the direction of movement of the cable, and means operative upon starting or re-starting of the torch for moving said torch back to its normal stationary position at a uniform speed.

3. Apparatus as in claim 2, including a carriage for said torch, a support for said carriage allowing movement of said carriage parallel to the longitudinal direction of the cable, and an electric tractor motor operative to move said carriage along said support.

4. Apparatus as in claim 3, having, in the supply circuit of the electric tractor motor, a contactor actuated by an operating coil and means for supplying current to the coil on flow of welding current through the torch.

5. Apparatus as in claim 3, having, in the supply circuit of the electric tractor motor, a speed-regulating device for that motor.

6. Apparatus as in claim 1, provided with means for increasing welding current during movement of the torch back to its normal stationary welding position.

7. Apparatus for forming a metal strip to constitute a sheath around at least one electric cable core, comprising in combination means for bringing the edges of the strip into juxtaposition in the longitudinal direction of the cable, a welding torch, a carriage for said torch, a support for said carriage allowing movement of said carriage parallel to the longitudinal direction of the cable, said carriage having a position corresponding to a position of the torch for performing the normal welding operation, an electric tractor motor operative to move said carriage along said support, a supply circuit for said motor, a limit switch in said supply circuit, and means for holding said switch open when the torch is in the position for performing the normal welding operation.

8. In an apparatus for ensheathing electric cable cores by progressively bending a metal strip to form around a cable core an open sheath with butting edges and electric arc welding the seam formed by said butting edges of said open sheath to form a closed sheath by advancing the said butting edges past a welding head: a welding torch, means moving the sheath and enclosed cable core past the torch, a movable carriage for said torch having a normal stationary welding position and at least one position displaced from said normal welding position in the direction of movement of said butting edges of the sheath past said welding torch, and means operative upon starting or re-starting of the torch for moving said torch back to its normal stationary position at a uniform speed.

9. In an apparatus for ensheathing electric cable cores by progressively bending a metal strip to form around a cable core an open sheath with butting edges and electric arc welding the seam formed by said butting edges of said open sheath to form a closed sheath by advancing the said butting edges past a welding head: a welding torch, a pair of forming rolls moving the sheath toward the torch, another pair of forming rolls maintaining the butting edges of the sheath at least in close proximity and pulling the sheath past the torch, said pairs of rolls being spaced from one another and located on opposite sides of the torch, a movable carriage for said torch having a normal stationary welding position, a first position for re-starting welding displaced a short distance from said normal welding position in the direction of movement of said butting edges of said sheath past said welding torch, and a second position for starting welding similarly displaced but a longer distance from said normal position, said second position being adjacent the second pair of rolls, and means operative upon starting or re-starting of the torch for moving said torch back to its normal stationary position at a uniform speed.

10. In apparatus as in claim 2, a method of operation on starting or re-starting the operation of welding together the edges of the strip, including the steps of causing the strip and cable core to travel longitudinally through the apparatus, moving the welding torch to a position displaced from the normal welding position in the said direction of travel of the cable, establishing the welding current, returning the torch to its normal welding position, and, during said return movement, increasing the welding current by an amount sufficient to compensate for the effect of the temporarily augmented rate of relative movement of the sheath past the torch.

11. In apparatus as in claim 1, wherein the means for bringing the edges of the strip into juxtaposition is constituted by two pairs of rolls, a method of operation according to which the strip and cable core are caused to travel through the apparatus, on starting to weld the edges of the strip together, the torch is located in a position in proximity to that said pair of rolls last encountered by the strip, welding current is established, the welding torch is moved to a position in proximity to that said pair of rolls first encountered by the strip, and welding is continued in said second-mentioned position.

12. In apparatus as in claim 1, wherein the means for bringing the edges of the strip into juxtaposition is constituted by two pair of rolls, a method of operation according to which, on starting to weld the edges of the strip together, the torch is located in a position in proximity to that said pair of rolls last encountered by the strip, welding current is established, the welding torch is moved to a position in proximity to that said pair of rolls first encountered by the strip, the welding current is increased during said movement by an amount sufficient to compensate for the effect of the temporarily augmented rate of relative movement of the sheath past the torch, and welding is continued in said second-mentioned position.

13. In apparatus as in claim 1, a method of operation according to which, on re-starting to weld a strip whereof a portion of the edges are already welded together, the torch is located in a position at which welding has already been effected, welding current is established, the welding torch is moved in a direction opposite to that of travel of the strip and cable core to a pre-determined position, and welding is continued in said pre-determined position.

14. In apparatus as in claim 1, a method of operation according to which, on re-starting to weld a strip whereof a portion of the edges are already welded together, the torch is located in a position at which welding has already been effected, welding current is established, the welding torch is moved in a direction opposite to that of travel of the strip and cable core to a pre-determined position, the welding current is increased during said movement by an amount sufficient to compensate for the effect of the temporarily augmented rate of relative movement of the sheath past the torch and welding is continued in said pre-determined position.

(References on following page)

References Cited in the file of this patent

UNITED STATES PATENTS

| | | |
|---|---|---|
| Re. 14,927 | Sessions | July 27, 1920 |
| 1,282,502 | Wagner et al. | Oct. 22, 1918 |
| 1,512,787 | Morton | Oct. 21, 1924 |
| 1,549,450 | Clarkson | Aug. 11, 1925 |
| 1,595,736 | Sels | Aug. 10, 1926 |
| 1,612,317 | Reed | Dec. 28, 1926 |
| 1,616,145 | Shipman | Feb. 1, 1927 |
| 1,827,245 | Lincoln et al. | Oct. 13, 1931 |
| 1,838,899 | Arnold | Dec. 29, 1931 |